June 29, 1926. 1,590,439
C. E. LEBRECHT
FLYTRAP
Filed Feb. 25, 1924 2 Sheets-Sheet 2
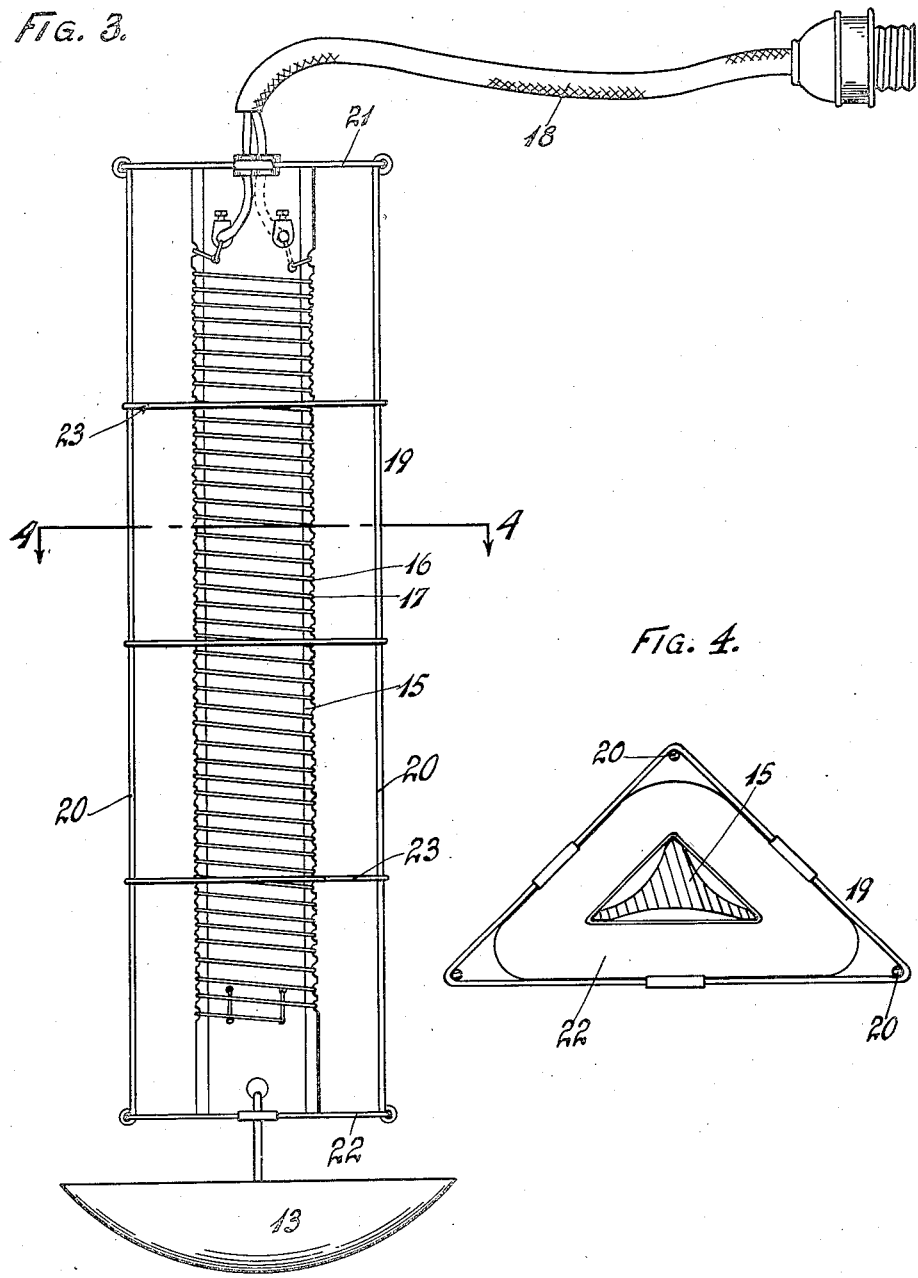
INVENTOR
CHARLES E. LEBRECHT.
BY
ATTORNEY Patented June 29, 1926.

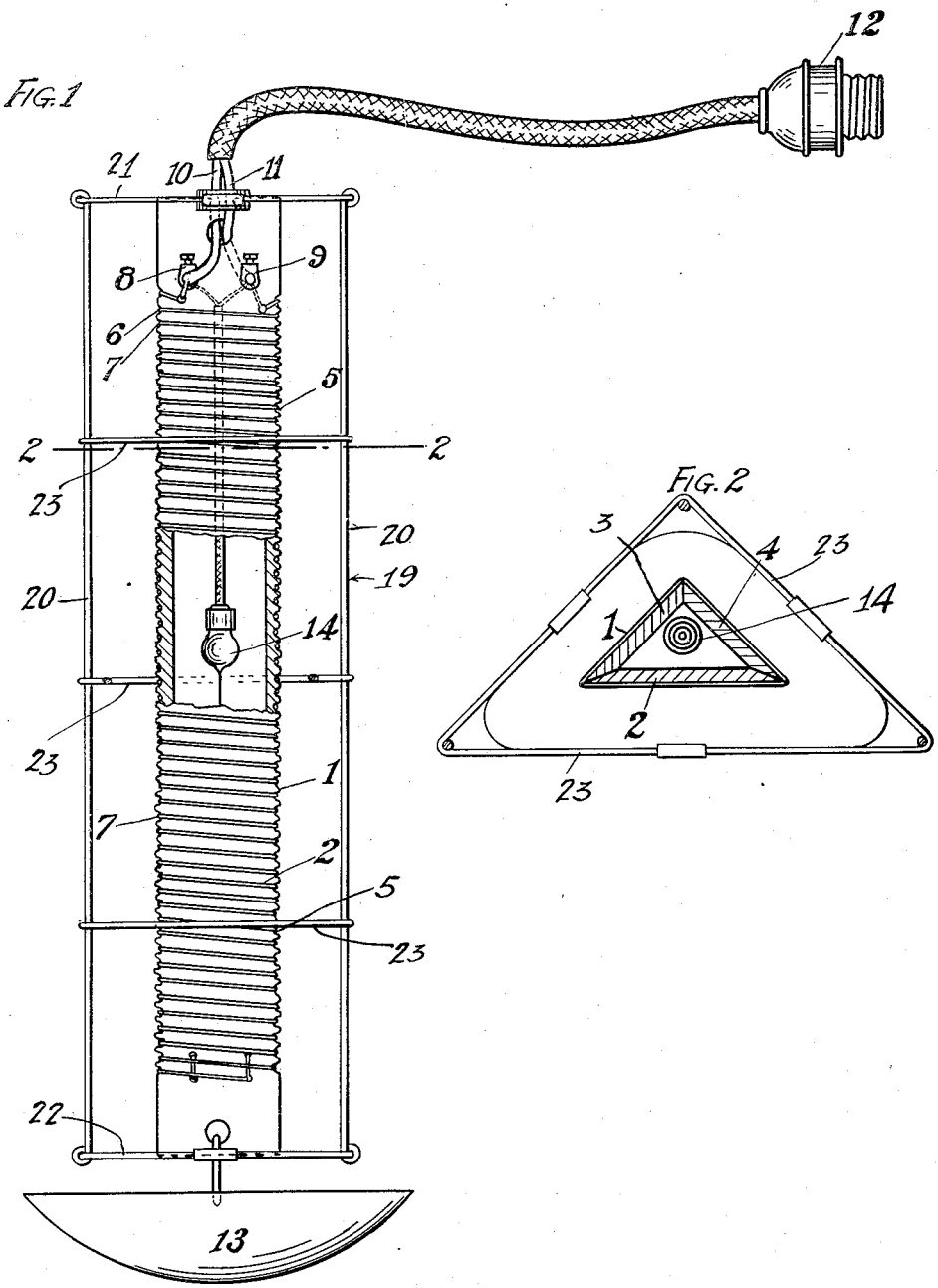

1,590,439

UNITED STATES PATENT OFFICE.

CHARLES E. LEBRECHT, OF OAKLAND, CALIFORNIA.

FLYTRAP.

Application filed February 25, 1924. Serial No. 694,983.

My invention is an improved insect trap in which the insects are electrocuted when alighting upon it.

The object of my invention is to provide a trap which is simple in construction and inexpensive to manufacture.

In the annexed drawing in which my invention is illustrated:

Figure 1 is a side view of my trap.

Figure 2 is a sectional view taken on line 2—2 of Fig. 1.

Figure 3 is a side view of a modified form of trap.

Figure 4 is a sectional view taken on the line 4—4 of Fig. 3.

Referring more particularly to the drawings, my invention consists of an elongated body 1 formed of an insulating material, preferably plate glass. The body 1 is formed of three panes of glass 2, 3 and 4, which are mitered at their edges. The panes 2, 3 and 4 are provided with notches 5 in the outer edge thereof in which the wires 6 and 7 are spirally wound in spaced relation. Thus all adjacent wires are of opposite potential and the insect alighting upon them forms a short circuit and is electrocuted.

These wires 6 and 7 are secured at the top to binding posts 8 and 9 respectively and to which the electric lead-in wires 10 and 11 extend. The leads 10 and 11 extend to a socket 12 which screws into the house fixture, thus suspending the trap for use. A cup 13 is suitably mounted to the bottom of the body 1, in which a lure is kept for ready placement on the wires 6 and 7.

A light 14 is suspended in the body 1, and the leads thereof extend to the posts 8 and 9. Thus the fly is attracted by the light and also by the mirror-like surface of the panes 2, 3 and 4. The wires wrapped about the panes serve to hold them together and forms a very inexpensive structure.

In the modified form shown in Figs 3 and 4, the body 15 is preferably triangular in cross section, as shown in Fig. 4. The wires 16 and 17 are wound upon the body as previously described, and are secured to the lead-in wires 18—18 as described.

To prevent other objects from contacting with the wires 16 and 17 and short circuiting them, a frame 19 is provided. This frame comprises vertical rods 20 secured to heads 21 and 22 at the ends thereof. A plurality of brace rods 23 encircle the rods 20.

The body 15 is mounted between the heads 21—22 and suitably secured thereto.

Having described my invention, I claim:

1. An insect trap comprising three panes of plate glass placed edge to edge, conducting wires wound about said panes and binding them in the form of a triangular prism, an electric bulb within the prism, and a receptacle suspended below said prism.

2. An insect trap comprising a prism formed of insulating strips placed edge to edge, such strips being provided with notches to receive conducting wires, conducting wires wound in said notches and holding said plates together in the form of a prism, and a receptacle pivotally suspended below said prism.

3. In combination, an elongated body of insulating material having two conducting wires spirally wound thereon in parallel and spaced relation, two supporting wires connecting to the former wires adapted for connection to a source of electrical energy and allowing the body to be suspended therefrom and a cage surrounding the body supported by a member resting on the top of the latter encircling the supporting wires so as to allow the cage to be slid upwardly on the body for rendering access to the latter.

In testimony whereof I affix my signature.

CHARLES E. LEBRECHT.